(12) United States Patent
Tsutsumi

(10) Patent No.: US 8,140,784 B2
(45) Date of Patent: Mar. 20, 2012

(54) STORAGE CONTROL DEVICE AND IMAGE PROCESSING DEVICE

(75) Inventor: Kenji Tsutsumi, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 800 days.

(21) Appl. No.: 12/141,765

(22) Filed: Jun. 18, 2008

(65) Prior Publication Data

US 2009/0161956 A1 Jun. 25, 2009

(30) Foreign Application Priority Data

Dec. 21, 2007 (JP) ................................. 2007-330790

(51) Int. Cl.
*G06F 13/00* (2006.01)
(52) U.S. Cl. ........................................ 711/159; 711/166
(58) Field of Classification Search ........................ None
See application file for complete search history.

(56) References Cited

U.S. PATENT DOCUMENTS

| | | | | |
|---|---|---|---|---|
| 2003/0079078 | A1* | 4/2003 | Zipprich et al. | 711/112 |
| 2004/0027603 | A1* | 2/2004 | Ueda et al. | 358/1.14 |
| 2005/0151997 | A1 | 7/2005 | Murakami et al. | |
| 2006/0117153 | A1* | 6/2006 | Tran et al. | 711/159 |
| 2007/0245100 | A1 | 10/2007 | Miyoshi | |
| 2007/0271427 | A1 | 11/2007 | Miyoshi et al. | |
| 2008/0177811 | A1* | 7/2008 | Cannon et al. | 707/206 |

FOREIGN PATENT DOCUMENTS

| | | |
|---|---|---|
| JP | 2004-153517 A | 5/2004 |
| JP | 2004-363834 A | 12/2004 |
| JP | 2005-346306 A | 12/2005 |
| JP | 2006-287871 A | 10/2006 |
| JP | 2007-241463 A | 9/2007 |
| JP | 2007-279816 A | 10/2007 |
| JP | 2007-280443 A | 10/2007 |
| JP | 2007-310608 A | 11/2007 |

OTHER PUBLICATIONS

Japanese Office Action dated Sep. 28, 2010 for corresponding Japanese patent application No. 2007-330790 and English-language translation.

* cited by examiner

*Primary Examiner* — Kaushikkumar Patel
(74) *Attorney, Agent, or Firm* — Sughrue Mion, PLLC

(57) ABSTRACT

A storage control device includes an obtaining unit that obtains data; a recognition unit that recognizes an area among areas in a storage unit, as a recordable area, the area to be recognized being where the data obtained by the obtaining unit is stored and overwriting has been executed a predetermined number of times; a recording unit that records data obtained by the obtaining unit onto the recordable area recognized by the recognition unit; a first overwriting unit that executes the overwriting on an area where data has been recorded by the recording unit and the overwriting has not yet been executed the predetermined number of times; and a specifying unit that specifies a remaining count for each of the areas in the storage unit, the remaining count indicating a difference between the predetermined number of times and a number of times the overwriting has been executed.

14 Claims, 2 Drawing Sheets

STORAGE CONTROL DEVICE AND IMAGE PROCESSING DEVICE

CROSS-REFERENCE TO RELATED APPLICATIONS

This application claims priority under 35 USC 119 from a Japanese patent application No. 2007-330790 filed Dec. 21, 2007.

BACKGROUND

1. Technical Field

The present invention relates to a storage control device and an image processing device.

2. Related Art

Magnetic storage media such as hard disks often cause a problem that, even after recorded data has been erased, residual magnetism by which the data was stored remains on a recording medium. Such residual magnetism results in a risk that data may not have been fully erased, and may subsequently be recovered. In order to erase data to an extent that it is irrecoverable from a magnetic recording medium, overwriting needs to be executed on an area where data is written. Data recovery usually becomes more difficult as the number of times such overwriting is executed increases.

SUMMARY

The present invention is directed to execution of overwriting on plural areas where data is recorded, to thereby prioritize an area from which data can be recovered with higher possibility.

According to one aspect of the invention, there is provided a storage control device comprising: an obtaining unit that obtains data; a recognition unit that recognizes an area from among areas in a storage unit, as a recordable area, the area to be recognized being where the data obtained by the obtaining unit is stored and overwriting has been executed a given number of times; a recording unit that records data obtained by the obtaining unit onto the recordable area recognized by the recognition unit; a first overwriting unit that executes the overwriting on an area where data has been recorded by the recording unit and the overwriting has not yet been executed the given number of times; and a specifying unit that specifies a remaining count for each of the areas in the storage unit, the remaining count indicating a difference between the given number of times and a number of times the overwriting has been executed, wherein the first overwriting unit executes the overwriting, prioritizing an area for which the remaining count specified by the specifying unit is greater than those for other areas among the areas in the storage unit.

BRIEF DESCRIPTION OF THE DRAWINGS

An exemplary embodiment of the invention will be described in detail based on the following figures, wherein.

DETAILED DESCRIPTION

1. Configuration

Figure 1:
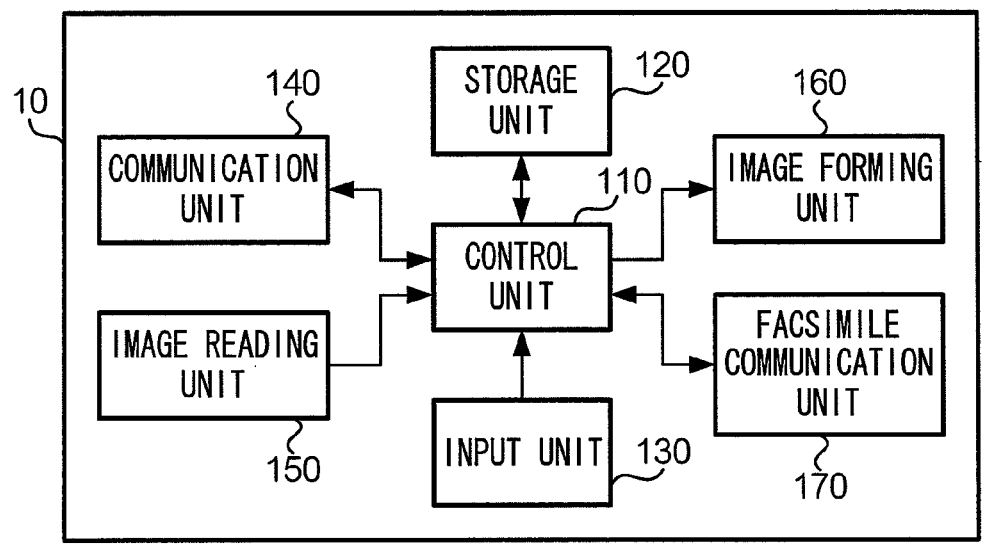
FIG. 1 is a block diagram showing a configuration of an image output device according to the exemplary embodiment of the invention.

FIG. 1 is a block diagram showing a configuration of an image output device 10 according to an exemplary embodiment of the invention. The image output device 10 is an example of an image forming device according to the invention, and includes an example of a storage control device according to the invention. As shown in FIG. 1, the image output device 10 includes a controller 110, a storage unit 120, a input unit 130, a communication unit 140, an image reading unit 150, an image forming unit 160, and a facsimile communication unit 170.

The controller 110 has a processor such as a CPU (Central Processing Unit) or an ASIC (Application Specific Integrated Circuit), and memories. The controller 110 controls operations of the image output device 10 by executing programs stored in the memory. The controller 110 serves also as an example of a storage control device according to the invention. The controller 110 obtains image information from the communication unit 140 or the image reading unit 150, and outputs the information to an image forming unit 160 or a facsimile communication unit 170, after executing appropriate image processings on the information. In this embodiment, the image processings executed by the controller 110 depend on an output destination, i.e., depend on whether an image is output to the image forming unit 160 or the facsimile communication unit 170. For example, in a case of outputting an image through the image forming unit 160, the controller 110 executes a color conversion processing, a rasterization processing, etc. In a case of outputting an image through the facsimile communication unit 170, the controller 110 executes a compression processing, etc.

The storage unit 120 has a storage device such as a HDD (Hard Disk Drive) and temporarily stores image information. The storage unit 120 uses a hard disk as a storage medium. A whole storage area of the hard disk is divided into plural areas each having a particular unit volume. These plural areas each are referred to as a "unit area". In this embodiment, the unit area is referred to as a sector. The sector has a volume of 512 bytes.

The receiving unit 130 includes a user interface such as buttons or keypads, and receives an instruction or information in response to manipulation on the user interface by a user. Upon receiving a instruction or information from a user, the receiving unit 130 supplies the controller 110 with manipulation information in response to the received instruction or information. The receiving unit 130 may alternatively be configured so as to employ a display device having a touch panel which receives an instruction or information from users.

The communication unit 140 and the image reading unit 150 each is an example of means to input image information. The communication unit 140 establishes connection with a network such as a LAN (Local Area Network) or the Internet, and obtains image information from other communication terminals which are also connected to the network. The image reading unit 150 has a scanner which optically reads an image as an original document, and generates image information (image data) as a result of reading the image.

The image forming unit 160 and the facsimile communication unit 170 each is a device for outputting image information. The image reading unit 150 obtains image information through the controller 110, and forms an image according to the image information by using color materials such as toner or ink. The facsimile communication unit 170 connects to a network such as a public switched telephone network, and sends image information to another communication terminal as a transmission destination for a document. The communication unit 140 and the facsimile communication unit 170 may connect to one common network or respectively to different networks.

2. Operation

The image output device 10 has a configuration as described above. With this configuration, the image output device 10 obtains image information through the communication unit 140 or the image reading unit 150, and outputs the obtained image information through the image forming unit 160 or the facsimile communication unit 170. The image output device 10 temporarily records the obtained image information in the storage unit 120, and erases image information which has been output, from the storage unit 120. At this time, the image output device 10 operates as follows.

Upon obtaining image information, the controller 110 of the image output device 10 searches the hard disk of the storage unit 120 for a recordable vacant area where the image information can be recorded. If there is a vacant area, the controller 110 records the image information onto the area. If not, the controller 110 waits, without starting recording, until a vacant area or areas, which are large enough to record the image information, are generated. Even if the image information occupies plural sectors, the plural sectors need not be consecutive sectors on the hard disk. The controller 110 supplies the image forming unit 160 or the facsimile communication unit 170 with the recorded image information. After the image forming unit 160 or the facsimile communication unit 170 outputs the image information, the controller 110 obtains information indicating that outputting of the image information is completed. Upon obtaining the image information, the controller 110 executes a processing for erasing the image information. This processing is carried out during so-called idling during which image information is being neither read from nor written into the storage unit 120.

When erasing image information, the image output device 10 executes overwriting plural times on a storage area where image information is recorded, so as to hinder recovery of erased image information. In this embodiment, the image output device 10 is assumed to clear a predetermined safety level by executing overwriting three times on an area where image information is recorded. The term "overwriting" is an operation of writing, over an area where image information is already recorded, different information from the image information recorded. The different information to be written over may be a constant value such as "0" or random values. For example, this embodiment is assumed to uniformly write a constant value into a storage area.

The controller 110 executes a processing for erasing image information during idling. When executing overwriting three times on a storage area, the controller 110 may carry out the overwriting three times sequentially in some cases or at intervals in other cases. Therefore, when output of certain image information is completed, the controller 110 then sets a remaining number of times (hereinafter referred to as a "remaining count") by which overwriting is still to be executed repeatedly on a storage area where the certain image information has been recorded. The remaining count indicates a difference obtained by subtracting the number of times overwriting has been executed, from an initial value indicating a predetermined number of times. The initial count is "3" for a recorded area which has not yet been subjected to overwriting at all, and this value is decreased by "1" each time overwriting is completed once. The remaining count may be stored into a memory of the controller 110 or may otherwise be stored into a different storage area from a storage area included in the storage unit 120 for storing image information.

The image output device 10 is capable of executing overwriting in two different ways, as follows. One way will be described below as an operation example 1 in which a predetermined overwriting processing is executed repeatedly. The other way will further be described below as an operation example 2 in which either one of two overwriting processings is selectively executed. These operation examples will be described with reference to flowcharts.

2-1. Operation Example 1

Figure 2:
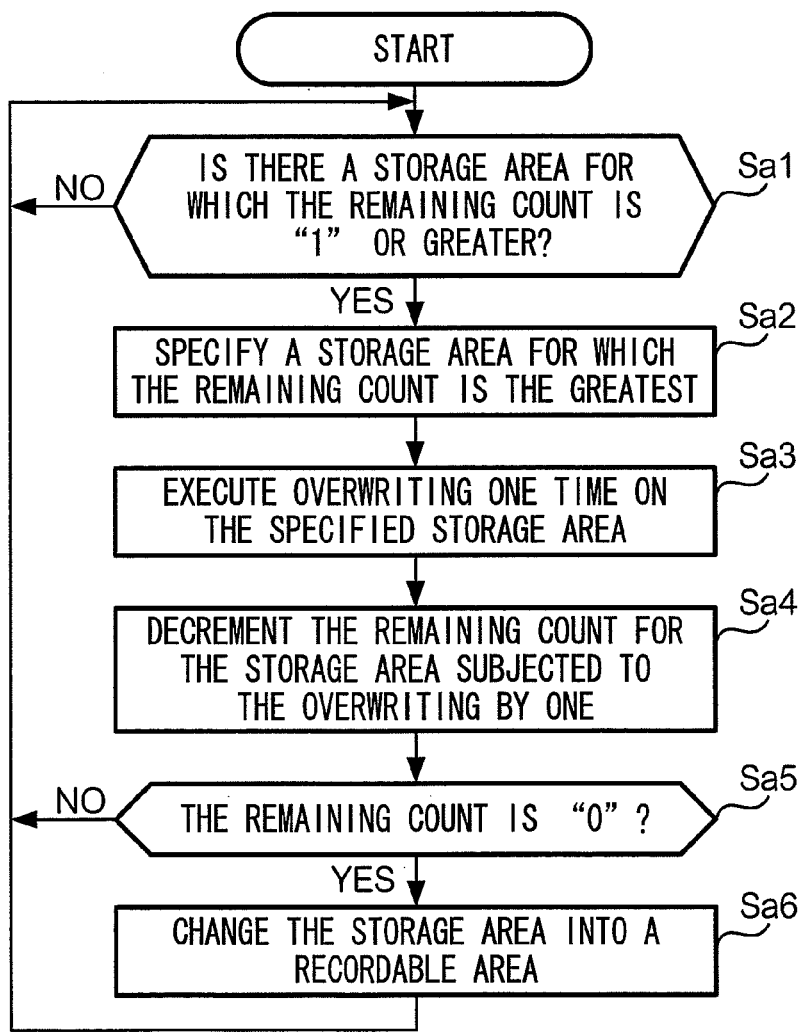
FIG. 2 is a flowchart showing a processing executed by the image output device.

FIG. 2 is a flowchart showing a processing executed by the image output device 10 in this operation example. This processing is a looped processing which is executed during idling, and is repeated until reading or writing of image information occurs as an interrupt processing. As shown in the flowchart, the controller 110 searches the entire storage area of the storage unit 120, to determine whether or not there is any storage area the remaining count of which is "1" or greater, i.e., whether or not there is any storage area where output of image information has been completed but overwriting has not yet been executed a predetermined number of times (three times in this example; step Sa1). If there is not such a storage area (step Sa1: NO), the controller 110 repeatedly makes the foregoing determination until such a storage area appears.

If there are one or more storage areas for each of which a remaining count of "1" or greater is set (step Sa1: YES), the controller 110 specifies an area the remaining count of which is the greatest among the plural storage areas (step Sa2). If there still are plural storage areas each of which satisfies this condition, the controller 110 further specifies one of the specified plural storage areas. The controller 110 executes overwriting one time on the storage area which is specified in this manner (step Sa3).

Upon execution of overwriting one time on the specified one storage area, as described above, the controller 110 decrements the remaining count which is set for the storage area subjected to the overwriting (step Sa4). In this case, the overwriting has been executed one time, and accordingly, the controller 110 decrements the remaining count by "1". Subsequently, the controller 110 determines whether or not the decremented remaining count is "0" (step Sa5). If the remaining count is determined to be "0" (step Sa5: YES), the controller 110 recognizes this storage area to be a recordable storage area (step Sa6). The recognized storage area will be hereinafter referred to as a "recordable area".

The controller 110 carries out the overwriting processing in the way described above. Each time the controller 110 obtains new image information, the controller 110 writes the new image information into a recordable area generated by the overwriting processing or into an unrecorded area.

According to this operation example, the image output device 10 executes overwriting on data, prioritizing a storage area for which a greater remaining count is set. For example, if there are mixed storage areas for which the remaining counts are "3" and "1", the controller 110 executes overwriting on storage areas for which the remaining count of "3" is set, prior to executing overwriting on the other storage areas for which the remaining count is "1". In other words, according to the operation example 1, the image output device 10 executes overwriting so as to eliminate, as soon as possible, storage areas which have not yet been subjected to overwriting at all or storage areas which have been subjected to overwriting a smaller number of times.

2-2. Operation Example 2

Figure 3:
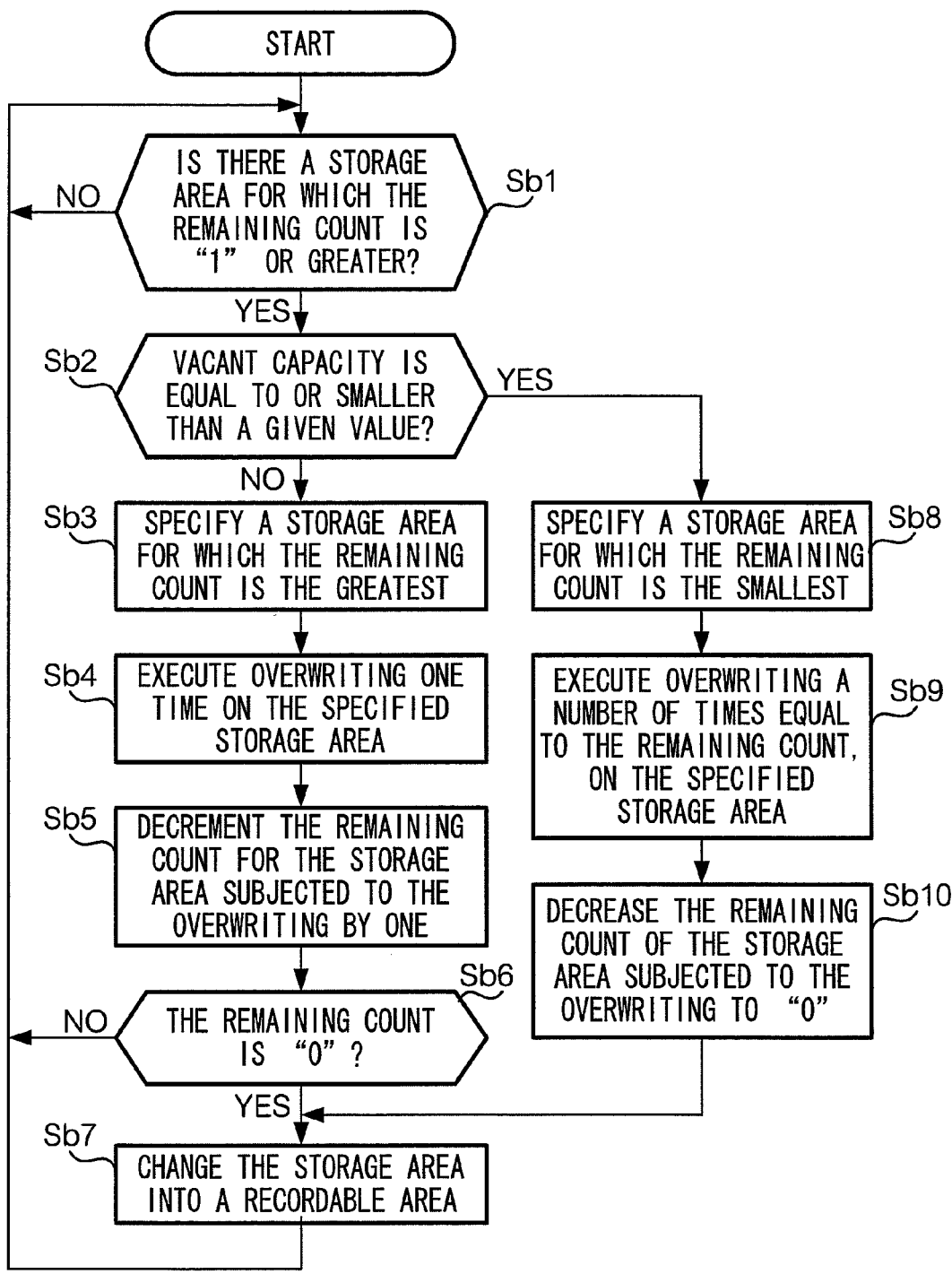
FIG. 3 is a flowchart showing another processing executed by the image output device.

FIG. 3 is a flowchart showing a processing which is executed by the image output device 10 in another operation example 2. The operation example 2 differs from the operation example 1 in that overwriting is executed selectively between a mode according to the operation example 1 and a different mode from the former mode. Therefore, operations common to the overwriting processing according to the operation example 1 will be appropriately omitted from descriptions made below of the operation example 2.

In the operation example 2, the controller 110 first determines whether or not there is any storage area for which a remaining count of "1" or more is set, as in the operation example 1 (step Sb1). Next, the controller 110 determines whether or not a vacant capacity remaining in the storage unit 120 is equal to or smaller than a given capacity (step Sb2). In this respect, an arbitrary value can be set as the given capacity to be used as reference a threshold for making the foregoing determination (in step Sb2). For example, the given capacity may be 5 to 10% of the whole storage capacity of the hard disk. If the vacant capacity in the storage unit 120 is greater than the given capacity (step Sb2: NO), the controller 110 executes the same overwriting processing as described in the operation example 1 described above (steps Sb3 to Sb7), as a first overwriting processing. Otherwise, if the vacant capacity in the storage unit 120 is not greater than the given capacity (step Sb2: YES), the controller 110 selects a second overwriting processing which is different from the overwriting processing according to the operation example 1.

If the vacant capacity is equal to or greater than the given capacity, the controller 110 specifies a storage area for which the smallest remaining count is set among one or more areas for each of which a remaining count of "1" or greater is set (step Sb8). If plural storage areas satisfy this condition, the controller 110 further specifies one of the specified plural storage areas (step Sb9). That is, if the remaining count of the storage area specified in this manner is "1", overwriting is executed one time. Otherwise, if the remaining count of the specified storage area is "2", overwriting is executed sequentially two times. The controller 110 then decrements the remaining count for the storage area which has thus been subjected to overwriting, by the number of times the overwriting has been executed (step Sb10).

In this case, the number of times the overwriting has been executed is equal to the remaining count, and the remaining count for the storage area subjected to the overwriting is "0". Accordingly, the controller 110 changes the storage area into a recordable area, without making a determination as made in the step Sb6.

According to the operation example 2, the image output device 10 executes the second overwriting processing on data, prioritizing a storage area for which a smaller remaining count is set, if the vacant capacity in the storage unit 120 is not smaller than a given capacity. In this case, the controller 110 executes overwriting processing sequentially a number of times equal to the remaining count, and then changes the storage area into a recordable area. According to the operation example 2, the image output device 10 executes the same first overwriting processing as in the operation example 1 if there remains a relatively large vacant capacity. If there remains a relatively small vacant capacity, the image output device 10 executes the second overwriting processing so that the recordable area is increased as soon as possible, i.e., vacant areas are increased so that the vacant capacity increases.

3. Modifications

The invention is not limited to the above embodiment but may be practiced in configurations other than those described in the above embodiment. For example, the invention may be modified as follows. Modifications described below may be combined appropriately with each other in use.

3-1. Modification 1

In the above embodiment, the first overwriting processing is to execute overwriting one time on a specified storage area. However, overwriting may be executed plural times on a specified area. For example, if overwriting needs to be executed as many times as possible in order to satisfy an expected safety level, overwriting may be executed two times on a specified area. In brief, in the first overwriting processing according to the invention, overwriting is executed sequentially a number of times not greater than the remaining count.

3-2. Modification 2

As described above, information used for overwriting may be arbitrarily determined. Therefore, the information to be overwritten may differ depending on the remaining count.

In the present invention, if overwriting is executed on a storage area for which the remaining count is "1", i.e., when the last overwriting is executed immediately before changing the storage area into a recordable area, image information which is obtained by the communication unit 140 or the image reading unit 150 may be used as the information to be overwritten into the storage area. This image information is unrecorded image information, which has not ever been recorded, and differs from image information which has been recorded in the storage area. That is, according to this modification, newly obtained unrecorded image information is used in place of any data specialized for overwriting, when image information is overwritten into a recorded storage area.

The configuration of this modification differs from that of the above embodiment in the following ways, where the two configurations are compared to each other. In case of this modification, a storage area is accessed a smaller number of times by one than that in the embodiment, until second image information is recorded in the storage area subsequent to first image information being recorded in the storage area, wherein the second image information differs from the first image information. However, in the storage area where the first image information is recorded, different information from the first image information has been written plural times, and a predetermined safety level is therefore satisfied.

This modification is applicable to either of the first and second overwriting processings.

3-3. Modification 3

In the operation example 2 described above, the reference for determining either the first or second overwriting processing to be executed is not limited to the vacant capacity in the storage unit 120. For example, either the first or the second overwriting processing may be selected as a user manipulates the input unit 130. Alternatively, either the first or the second overwriting processing may be selected depending on information which is obtained in association with image information.

If a user of a communication terminal can be specified, for example, by authentication in a configuration in which image information is transmitted from communication terminals, information which identifies a user, or a property (such as authority) of a user, may be obtained in association with image information. For example, there may be a case that there are two users, and one of the users more often deals with important documents than the other user. In this case, the former user and the latter user may be distinguished from each other. The first overwriting processing may be executed on image information obtained from the former user, and the second overwriting processing may be executed on image information obtained from the latter user. Further, if a remaining count for a storage area where the image information obtained from the former user is recorded is equal to a remaining count for a storage area where the image information obtained from the latter user is recorded, which of these storage areas is subjected to overwriting first may be determined depending on information which identifies the user or a property of the user, or depending on a time point when data of the image information was written. If a storage area to be subjected to overwriting first is determined depending on such a time point when data was written, there is a need for a measure for specifying a time point when data is written into a storage area. In this case, overwriting is carried out desirably prioritizing a storage area into which recorded data was written at an earliest time point.

The information to be associated with image information may be information which indicates importance of the image information.

3-4. Modification 4

If there are plural storage areas as targets among which a storage area is to be specified in the step Sb8 described above, this step may be configured as follows. That is, the number of sectors occupied by (or a stored volume of image information contained in) each of the plural storage areas is specified first, and overwriting is then executed, prioritizing a storage area which occupies a smaller number of sectors (or contains a smaller stored volume of image information). With this configuration, a storage area which can be overwritten in a shorter time is prioritized among plural storage areas as targets among which a storage area is to be specified.

Also, if there are plural storage areas as targets among which a storage area is to be specified, in addition, a configuration described below can be adopted. That is, a storage area in which presently recorded data was recorded at an earlier time point is specified first, i.e., a storage area where older recorded data remains is specified first. Overwriting is then executed on the specified area. With this configuration, a storage area which has a high possibility to be accessed for a longer time duration is prioritized. To practically constitute this configuration, there is a need for a measure for specifying a time point when data is written into a storage area.

3-5. Modification 5

The first overwriting processing described above is to execute overwriting so as to eliminate, as soon as possible, storage areas which have not yet been subjected to overwriting at all, or storage areas which have been subjected to overwriting a smaller number of times. The second overwriting processing is to ensure vacant areas as soon as possible. In other words, in case of performing the first overwriting processing, the safety level of the entire hard disk improves more although the number of storage areas which satisfy an expected safety level is smaller, compared with a case of performing the second overwriting processing. In a case of performing the second overwriting processing, storage areas which have a higher possibility of being recovered continue to be left not overwritten although the number of storage areas which satisfy the expected safety level is greater, compared with case of performing the first overwriting processing.

Storage areas which are not subjected to overwriting at all can be said to have far higher possibility of being recovered than the other storage areas.

In view of the features described above, the first overwriting processing may be carried out in a manner as described below, in a mode of selectively executing the first or second overwriting processing. That is, if there is an unrecorded storage area which has not been subjected to overwriting at all in this mode, i.e., if there is a storage area for which the remaining count stays unchanged from an initial value in this mode, the first overwriting processing is executed, prioritizing the storage area. Thus, according to this modification, if there is a storage area for which the remaining count stays unchanged from an initial value, the first overwriting processing is selectively executed with higher priority.

3-6. Modification 6

Execution of the second overwriting processing is not limited to a period of idling as described previously. For example, when trying to record image information of a certain volume in a case where the storage unit 120 includes no vacant area at all, the second overwriting processing may be executed repeatedly until a sufficient vacant area for recording the image information is ensured.

3-7. Modification 7

Unit areas according to the invention are not limited to sectors. Specifically, a storage area may be divided into areas which are different from sectors, and data such as image information may be written into the divided areas. The unit areas need not have an equal storage capacity.

3-8. Modification 8

The storage unit applicable to the invention is constituted by use of a recording medium, such as a hard disk described above, from which previously written data can be recovered even after other data is written over the previously written data. Accordingly, the storage unit according to the invention is not limited to a hard disk device and may be other devices so long as the storage unit is constituted by use of such a recording medium.

3-9. Modification 9

The invention is applicable to electronic devices other than the image output device 10 in the above embodiment. For example, only one of the communication unit 140 and the image reading unit 150 may be configured to obtain image information, or any different configuration may be employed. For example, the facsimile communication unit 170 may be used, as a measure for obtaining an image, so that image information is obtained by facsimile communication. In addition, only one of the image forming unit 160 and the facsimile communication unit 170 may be configured to output image information, or any different configuration may be employed. The specific configuration of the configuration of outputting image information is not particularly limited to the configuration described in the above embodiment so long as any processing is executed depending on obtained image information.

According to the invention, data as a target to be recorded into the storage unit is not limited to image information but may be other data expressing audio or a moving image, for example.

The invention can also be specified as a program which causes a computer to perform functions of the controller 110 described previously. Such a program according to the invention can be provided on a recording medium such as an optical disk in which the program is stored. Alternatively, the program may be downloaded from a predetermined server device via a network such as the Internet. The downloaded program may be installed and can then be put to use.

The functions performed by the invention may be constituted as functions (file systems) of an operating system or as functions of any software which is superordinate or subordinate to an operating system.

What is claimed is:

1. A storage control device comprising:
    a recognition unit that recognizes an area among areas in a storage unit, as a recordable area, if overwriting has been executed on the area a predetermined number of times;
    a specifying unit that specifies a remaining count for each of the areas in the storage unit, the remaining count indicating a difference between the predetermined number of times and a number of times overwriting has been executed; and
    a first overwriting unit that executes overwriting on an area where data has been recorded and overwriting has not yet been executed the predetermined number of times, by prioritizing an area for which the remaining count specified by the specifying unit is greater than those for other areas among the areas in the storage unit, even if overwriting has already been executed once on the area for which the specified remaining count is greater than those for other areas among the areas in the storage unit.

2. The storage control device according to claim 1, further comprising:
    a second overwriting unit; and
    a selection unit that selects either the first or the second overwriting unit to execute overwriting;
    wherein, if the second overwriting unit is selected by the selection unit, then the second overwriting unit executes overwriting on the area where data has been recorded and overwriting has not yet been executed the predetermined number of times, so that overwriting is executed sequentially a second number of times by prioritizing an area for which the remaining count specified by the specifying unit is smaller than those for other areas among the areas in the storage unit, the second number of times being equal to the remaining count specified by the specifying unit for the area prioritized by the second overwriting unit.

3. The storage control device according to claim 1, wherein, after the first overwriting unit executes overwriting a third number of times, which is determined by subtracting one from the remaining count for the area prioritized by the first overwriting unit, with predetermined data for overwriting, the first overwriting unit further executes overwriting one time with data obtained by an obtaining unit.

4. The storage control device according to claim 2, wherein the second overwriting unit is selected by the selection unit if the recordable area of the storage unit is equal to or smaller than a predetermined capacity.

5. The storage control device according to claim 2, wherein, the second overwriting unit is selected by the selection unit and after the second overwriting unit executes overwriting a third number of times, which is determined by subtracting one from the remaining count for the area prioritized by the second overwriting unit, with predetermined data for overwriting, the second overwriting unit further executes overwriting with data obtained by an obtaining unit.

6. The storage control device according to claim 2, wherein the selection unit selects one of the first and the second overwriting unit, depending on at least one of information associated with an instruction by a user or data recorded on the area.

7. The storage control device according to claim 1, wherein the first overwriting unit executes overwriting sequentially a fourth number of times by prioritizing the area for which the remaining count specified by the specifying unit is greater than those for other areas among the areas in the storage unit, the fourth number of times being equal to the remaining count specified by the specifying unit for the area prioritized by the first overwriting unit.

8. The storage control device according to claim 1, wherein the first overwriting unit executes overwriting one time, by prioritizing the area for which the remaining count specified by the specifying unit is greater than those for other areas among the areas in the storage unit.

9. The storage control device according to claim 2, wherein each of the areas in the storage unit includes a plurality of unit areas, and
    if a plurality of sets of data are recorded on the areas in the storage unit, and the second overwriting unit is selected by the selection unit, then the second overwriting unit executes overwriting by prioritizing an area occupied by one of the plurality of sets of data which occupies a smaller number of the unit areas than other sets of the plurality of sets of data.

10. The storage control device according to claim 2, wherein if there is an area among the areas in the storage unit, for which the remaining count is the predetermined number of times, then the selection unit selects the first overwriting unit, and the first overwriting unit executes overwriting on the area for which the remaining count is the predetermined number of times.

11. The storage control device according to claim 1, wherein the first overwriting unit executes the overwriting by always prioritizing an area for which the remaining count specified by the specifying unit is greater than those for the other areas among the areas in the storage unit, regardless of how many times overwriting has already been executed on the area.

12. A method comprising:
    recognizing an area among areas in a storage unit, as a recordable area, if overwriting has been executed on the area a predetermined number of times;
    specifying a remaining count for each of the areas in the storage unit, the remaining count indicating a difference between the predetermined number of times and a number of times overwriting has been executed; and
    executing overwriting on an area where data has been recorded and overwriting has not yet been executed the predetermined number of times
    by prioritizing an area for which the specified remaining count is greater than those for other areas among the areas in the storage unit, even if overwriting has already been executed once on the area for which the specified remaining count is greater than those for other areas among the areas in the storage unit.

13. A computer readable storage medium storing a program causing a computer to execute a process, the process comprising:

recognizing an area among areas in a storage unit, as a recordable area, if overwriting has been executed on the area a predetermined number of times;

specifying a remaining count for each of the areas in the storage unit, the remaining count indicating a difference between the predetermined number of times and a number of times overwriting has been executed; and executing overwriting on an area where data has been recorded and overwriting has not yet been executed the predetermined number of times by prioritizing an area for which the specified remaining count is greater than those for other areas among the areas in the storage unit, even if overwriting has already been executed once on the area for which the specified remaining count is greater than those for other areas among the areas in the storage unit.

14. A storage control device comprising:
an obtaining unit that obtains data;
a recognition unit that recognizes an area among areas in a storage unit, as a recordable area, the area to be recognized being where the data obtained by the obtaining unit is stored and overwriting has been executed a predetermined number of times;
a recording unit that records data obtained by the obtaining unit onto the recordable area recognized by the recognition unit;
a first overwriting unit that executes overwriting on an area where data has been recorded and overwriting has not yet been executed the predetermined number of times; and
a specifying unit that specifies a remaining count for each of the areas in the storage unit, the remaining count indicating a difference between the predetermined number of times and a number of times overwriting has been executed,
wherein the first overwriting unit executes overwriting, prioritizing an area for which the remaining count specified by the specifying unit is greater than those for other areas among the areas in the storage unit, and
wherein the storage control device further comprises:
a second overwriting unit; and
a selection unit that selects either the first or the second overwriting unit to execute overwriting;
wherein, if the second overwriting unit is selected by the selection unit, then the second overwriting unit executes overwriting on the area where data has been recorded by the recording unit and overwriting has not yet been executed the predetermined number of times, so that overwriting is executed sequentially a second number of times, prioritizing an area for which the remaining count specified by the specifying unit is smaller than those for other areas among the areas in the storage unit, the second number of times being equal to the remaining count specified by the specifying unit for the area prioritized by the second overwriting unit.

* * * * *